(12) United States Patent
Hirai et al.

(10) Patent No.: US 9,268,369 B2
(45) Date of Patent: Feb. 23, 2016

(54) ELECTRONIC APPARATUS

(71) Applicant: Kabushiki Kaisha Toshiba, Tokyo (JP)

(72) Inventors: Yuichi Hirai, Hamura (JP); Masataka Tokoro, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/062,721

(22) Filed: Oct. 24, 2013

(65) Prior Publication Data

US 2014/0211445 A1  Jul. 31, 2014

Related U.S. Application Data

(63) Continuation of application No. PCT/JP2013/058395, filed on Mar. 22, 2013.

(30) Foreign Application Priority Data

Jan. 31, 2013 (JP) ................................ 2013-016838

(51) Int. Cl.
*H01F 7/00* (2006.01)
*H01F 7/20* (2006.01)
*G06F 1/16* (2006.01)

(52) U.S. Cl.
CPC ............ *G06F 1/1654* (2013.01); *G06F 1/1669* (2013.01)

(58) Field of Classification Search
CPC .................................................... G06F 1/1626
USPC .................................................. 335/219, 285
See application file for complete search history.

(56) References Cited

U.S. PATENT DOCUMENTS

| | | | |
|---|---|---|---|
| 6,700,775 B1 * | 3/2004 | Chuang et al. ............ | 361/679.01 |
| 6,929,291 B2 * | 8/2005 | Chen .......................... | 292/251.5 |
| 6,986,492 B2 * | 1/2006 | Huang et al. .............. | 248/346.03 |
| 6,992,882 B2 * | 1/2006 | Wang ......................... | 361/679.57 |
| 7,541,907 B2 * | 6/2009 | Wang et al. ................. | 335/305 |
| 8,143,983 B1 * | 3/2012 | Lauder et al. ................ | 335/219 |

(Continued)

FOREIGN PATENT DOCUMENTS

| | | |
|---|---|---|
| JP | 8-23178 | 1/1996 |
| JP | 11-048869 | 2/1999 |

(Continued)

OTHER PUBLICATIONS

English Translation of International Search Report from corresponding PCT/JP2013/058395 mailed Jun. 18, 2013.

(Continued)

*Primary Examiner* — Alexander Talpalatski
(74) *Attorney, Agent, or Firm* — Rutan & Tucker, LLP; William W. Schaal

(57) ABSTRACT

According to one embodiment, an electronic apparatus includes a first unit, a second unit, first magnets, and second magnets. The first magnets are at the first unit and include south poles and north poles configured to face in a direction from the first unit toward the second unit or in an opposite direction to the direction. The south pole and the north pole of one of any adjacent two of the first magnets face in opposite directions to facing directions of the south pole and the north pole of the other. The second magnets are at the second unit and configured to face the first magnets. The second magnets include a south pole which faces one of the north poles of the first magnets and a north pole which faces one of the south poles of the first magnets.

4 Claims, 14 Drawing Sheets

(56) References Cited

U.S. PATENT DOCUMENTS

| | | | |
|---|---|---|---|
| 8,390,411 B2* | 3/2013 | Lauder et al. | 335/219 |
| 8,390,413 B2* | 3/2013 | Lauder et al. | 335/219 |
| 8,416,568 B2* | 4/2013 | Tian et al. | 361/679.55 |
| 8,576,031 B2* | 11/2013 | Lauder et al. | 335/219 |
| 8,599,542 B1* | 12/2013 | Healey et al. | 361/679.17 |
| 8,665,045 B2* | 3/2014 | Lauder et al. | 335/219 |
| 8,773,850 B2* | 7/2014 | Minaguchi et al. | 361/679.44 |
| 8,817,457 B1* | 8/2014 | Colby et al. | 361/679.29 |
| 2003/0017746 A1* | 1/2003 | Lee | 439/638 |
| 2004/0190239 A1* | 9/2004 | Weng et al. | 361/683 |
| 2006/0152897 A1* | 7/2006 | Hirayama | 361/683 |
| 2007/0103266 A1* | 5/2007 | Wang et al. | 335/285 |
| 2007/0177347 A1 | 8/2007 | Nishiyama | |
| 2009/0103261 A1 | 4/2009 | Shih | |
| 2010/0238620 A1 | 9/2010 | Fish | |
| 2011/0292584 A1 | 12/2011 | Hung et al. | |
| 2012/0314342 A1 | 12/2012 | Sheu et al. | |
| 2013/0170126 A1* | 7/2013 | Lee | 361/679.17 |
| 2013/0194742 A1 | 8/2013 | Hung et al. | |
| 2013/0201619 A1 | 8/2013 | Hung et al. | |

FOREIGN PATENT DOCUMENTS

| | | |
|---|---|---|
| JP | 2003-76438 | 3/2003 |
| JP | 2005-039019 | 2/2005 |
| JP | 2007-206900 | 8/2007 |
| JP | 2008-90872 | 4/2008 |
| JP | 2011-248872 | 12/2011 |
| JP | 2012-256305 | 12/2012 |

OTHER PUBLICATIONS

International Search Report from corresponding PCT/JP2013/058395 mailed Jun. 18, 2013.

PCT/JP2013/058395 filed Mar. 22, 2013 International Preliminary Report dated Aug. 4, 2015.

\* cited by examiner

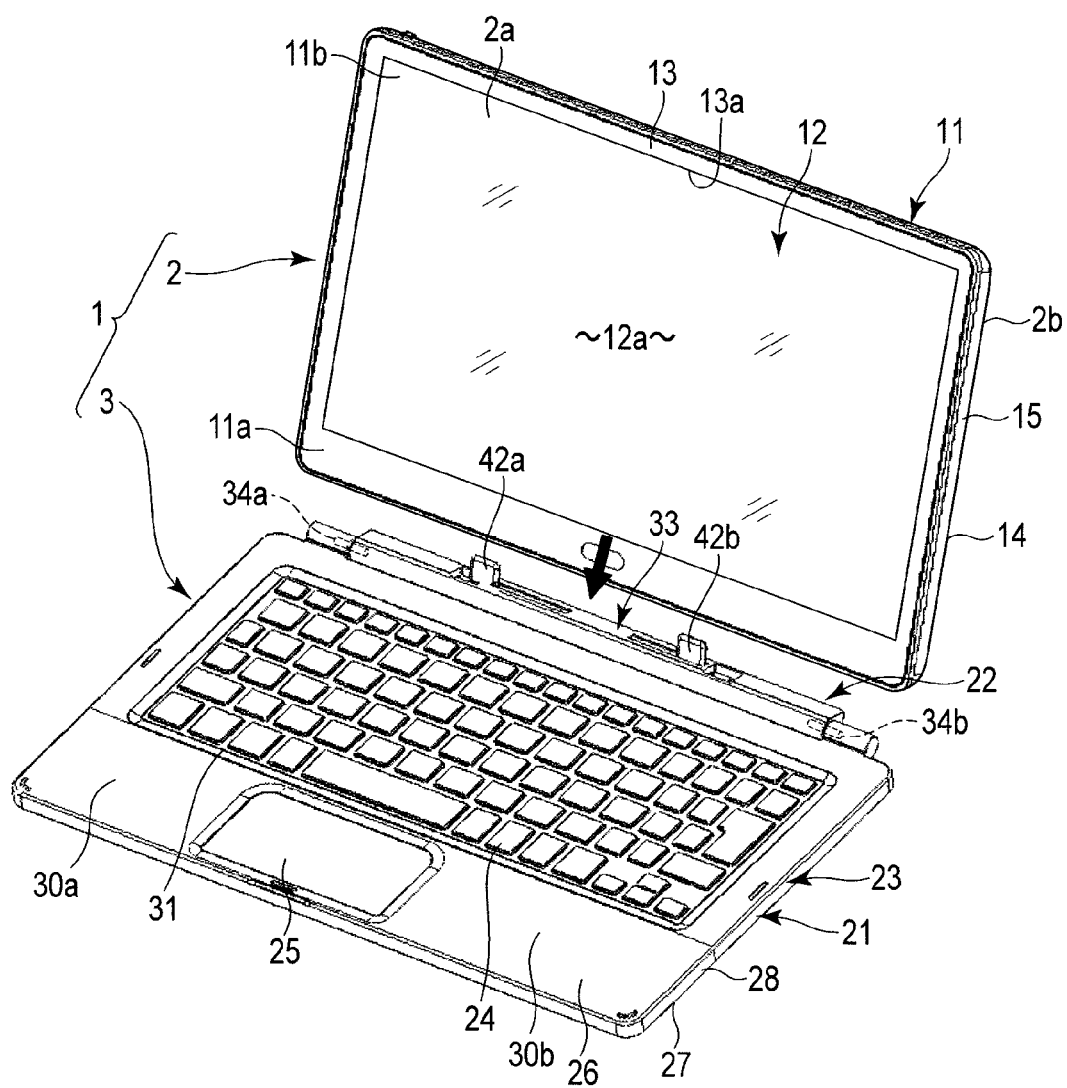
F I G. 1

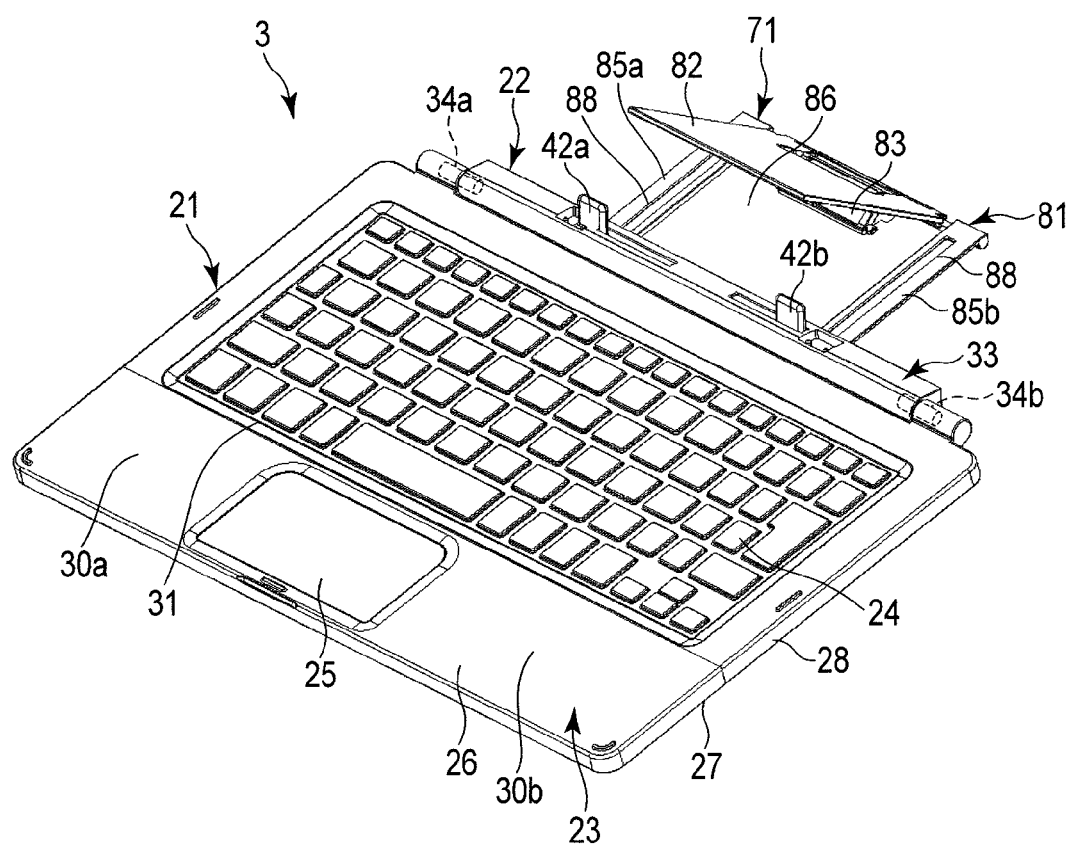
F I G. 8

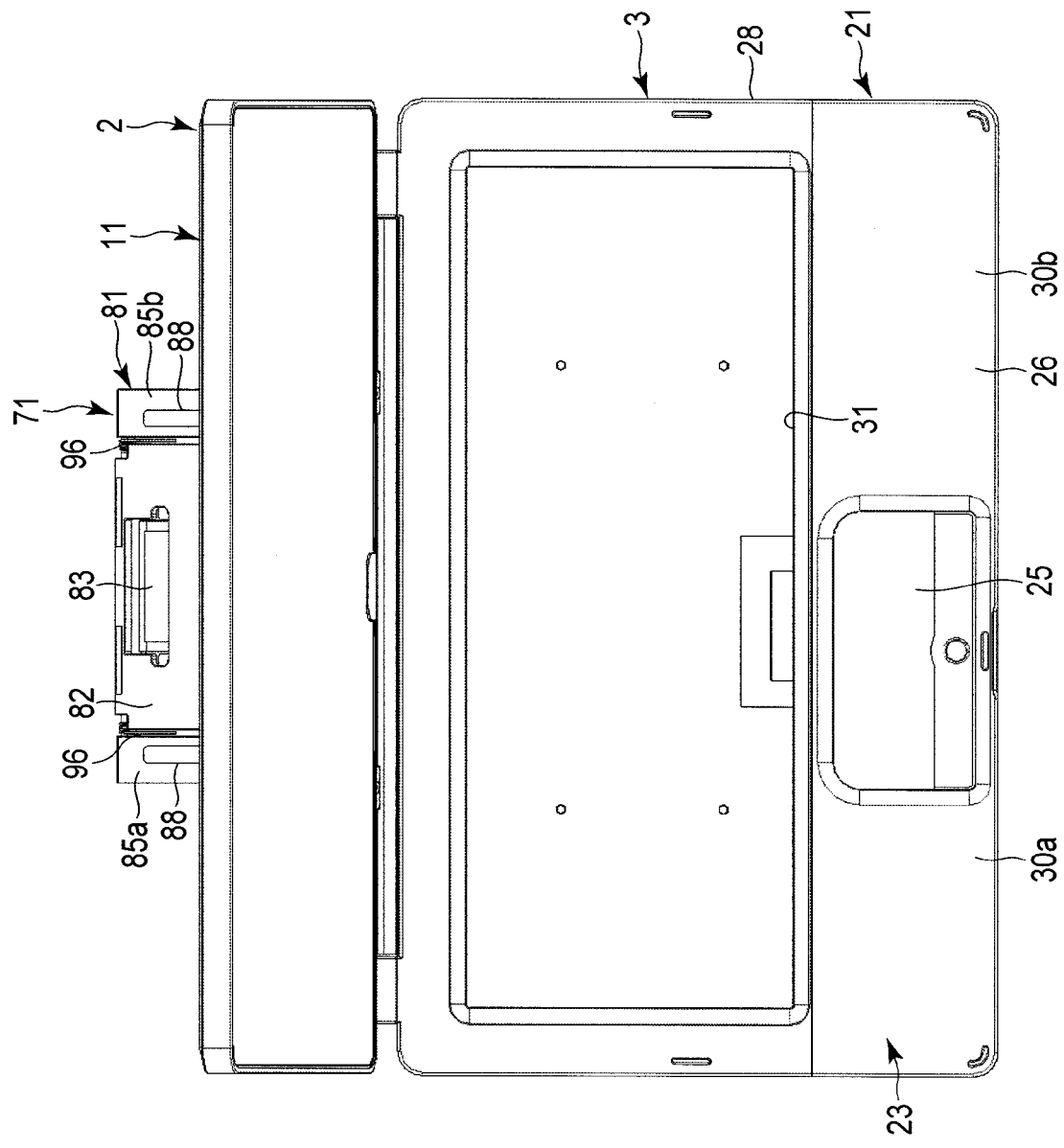
F I G. 14

ELECTRONIC APPARATUS

CROSS REFERENCE TO RELATED APPLICATIONS

This application is a Continuation application of PCT Application No. PCT/JP2013/058395, filed Mar. 22, 2013 and based upon and claiming the benefit of priority from Japanese Patent Application No. 2013-016838, filed Jan. 31, 2013, the entire contents of all of which are incorporated herein by reference.

FIELD

Embodiments described herein relate generally to electronic apparatuses.

BACKGROUND

Cradles to which electronic apparatuses to be detachably attached have been provided.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view of a tablet set according to a first embodiment.

FIG. 8 is an exemplary perspective view showing a stand of a dock shown in FIG. 1.

FIG. 14 is an exemplary plan view of the table set shown in FIG. 1.

DETAILED DESCRIPTION

Figure 2:
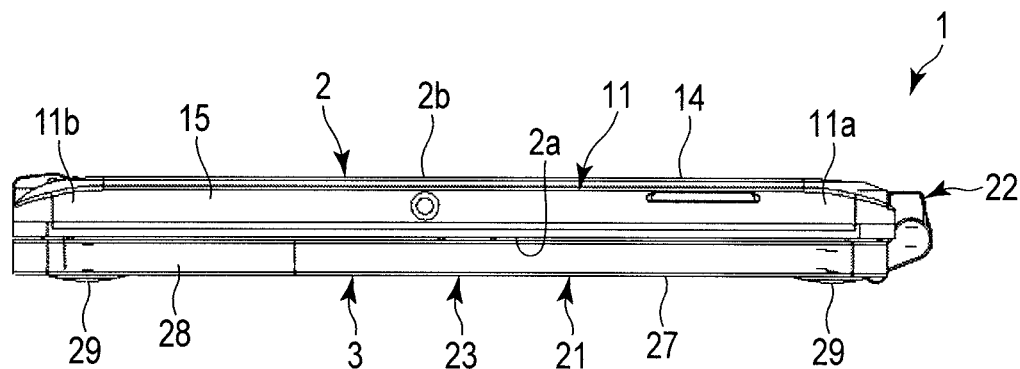
FIG. 2 is an exemplary side view of a closed state of the table set shown in FIG. 1.

Various embodiments will be described hereinafter with reference to the accompanying drawings.

In general, according to one embodiment, an electronic apparatus comprises a first unit, a second unit, first magnets, and second magnets. The second unit is configured to be detachably attached to the first unit. The first magnets are at the first unit and have substantially the same size as each other. The first magnets comprise south poles and north poles configured to face in a direction from the first unit toward the second unit or in an opposite direction to the direction. The south pole and the north pole of one of any adjacent two of the first magnets face in opposite directions to facing directions of the south pole and the north pole of the other. The second magnets are at the second unit and configured to face the first magnets. The second magnets comprise a south pole which faces one of the north poles of the first magnets and a north pole which faces one of the south poles of the first magnets.

In this specification, some components are expressed by two or more terms. Those terms are just examples. Those components may be further expressed by another or other terms. And the other components which are not expressed by two or more terms may be expressed by another or other terms.

Embodiments will be explained with reference to the drawings.

First Embodiment

A tablet set 1 according to the first embodiment 1 will be explained with reference to FIGS. 1 to 14.

The tablet set 1 is an example of "electronic apparatus". As shown in FIG. 1, the tablet set 1 comprises a tablet type of personal computer 2 (i.e., a tablet terminal, a tablet body, or a slate PC, hereinafter a tablet PC) and a dock 3 to which the tablet PC is detachably attached.

The tablet PC 2 itself is another example of "electronic apparatus". The dock 3 is an example of "unit", "external unit" or "first unit". From another point of view, the dock 3 itself is a further another example of "electronic apparatus", and the tablet PC 2 is an example of "unit", "external unit" or "second unit". It should be noted that the electronic apparatus to which the first embodiment can be applied is not limited to the above examples; that is, the embodiment can be applied to various electronic apparatuses such as a cell phone (including a smart phone) and a game machine.

As shown in FIG. 1, the tablet PC 2 comprises a housing 11 and a display device 12 provided in the housing 11. The display device 12 comprises a display screen 12a on which a touch sensor (i.e., a touch panel) is provided. The display screen 12a can receive an input operation by, e.g., a digitizer pen. Instead, the display screen 12a may receive an input operation by a user's finger.

The display device 12 is provided in the housing 11 and an example of an electronic component which may be affected, e.g., by a magnetic field of a magnet. It should be noted that the electronic component which may be affected by the magnetic field is not limited to the display device 12; that is, various components can be considered as such electric components.

As shown in FIG. 1, the housing 11 comprises a front wall 13 (i.e., an upper wall or a first wall), a rear wall 14 (i.e., a bottom wall, a lower wall, or a second wall) and a peripheral wall 15 (i.e., a third wall). It is formed in the shape of a flat box. The front wall 13 comprises an opening 13a from which the display screen 12a is exposed. The rear wall 14 is located opposite to the front wall 13, and extends in substantially parallel with the front wall 13. The rear wall 14 faces a surface of a desk (i.e., a placement surface or an external placement surface) when the tablet PC 2 is placed as a discrete device on the desk. At least a part of the peripheral wall 15 extends in a direction crossing the front wall 13 and the rear wall 14, and connects a peripheral end of the front wall 13 and a peripheral end of the rear wall 14. The front wall 13 forms a part of a first surface 2a (i.e., a front surface or an upper surface) of the tablet PC 2. At the first surface 2a, the display screen 12a is exposed. The rear wall 14 forms a second surface 2b (i.e., a rear surface, a bottom surface or a lower surface) of the tablet PC 2. The second surface 2b is located opposite to the first surface 2a.

The housing 11 comprises a first end 11a and a second end 11b. The first end 11a is an end to be attached to the dock 3. The first end 11a extends in the longitudinal direction of, e.g., the housing 11. The second end 11b is located on the opposite side of a side where the first end 11a is located.

Next, the dock 3 will be explained.

As shown in FIG. 1, the dock 3 (i.e., a cradle, a supporting unit, a supporting portion, a base, a connection device, or an extension device) comprises a main body 21 (e.g., a dock main body) and a rotation portion 22. The main body 21 comprises a housing 23, a keyboard 24 and a pointing device 25 which are provided at the housing 23. The housing 23 comprises an upper wall 26 (i.e., a first wall), a bottom wall (i.e., a lower wall or a second wall) and a peripheral wall 28 (i.e., a third wall), and is formed in the shape of a flat box.

The bottom wall 27 faces a surface of a desk (i.e., a placement surface or an external placement surface) when the dock 3 is placed on the desk. The bottom wall 27 comprises a plurality of leg portions 29 (see FIG. 2) to be in contact with the surface of the desk. The upper wall 26 is located opposite to the bottom wall 27, and extends in substantially parallel with the bottom wall 27 (i.e., in substantially parallel with the surface of the desk). At least a part of the peripheral wall 28 extends in a direction crossing the upper wall 26 and the bottom wall 27, and connects a peripheral end of the upper wall 26 and a peripheral end of the bottom wall 27.

As the pointing device 25, for example, a click pad or a touch pad is provided. Each of the keyboard 24 and the pointing device 25 is an example of "input portion". It should be noted that the input portion or portions provided at the dock 3 are not limited to the keyboard 24 or the pointing device 25; that is, a touch sensor (i.e., a touch panel) or another input device may be provided as the input portion.

The keyboard 24 and the pointing device 25 are provided at the upper wall 26. The upper wall 26 comprises palm rests 30a and 30b on the both sides of the pointing device 25. The upper wall 26 comprises a keyboard attaching portion 31 to which the keyboard 24 is attached. The keyboard attaching portion 31 is a recess which is recessed from edge portions of the palm rests 30a and 30b toward the inside of the housing 23.

The rotation portion 22 is provided at a rear end of the main body 21. The rotation portion 22 comprises a housing 33. The housing 33 extends along the rear end of the main body 21. To the rotation portion 22, the tablet PC 2 is detachably attached.

The housing 33 of the rotation portion 22 is rotatably connected to the housing 23 of the main body 21 by a pair of hinge portions 34a and 34b. By virtue of this structural feature, the table PC 2 connected to the rotation portion 22 can be rotated between a first position where it is laid on the main body 21 of the dock 3 (see FIG. 2) and a second position where it is located to stand with respect to the main body 21 of the dock 3 (see FIG. 3).

In the first position, the display screen 12a faces the keyboard 24 and the pointing device 25. Also, in the first position, the display screen 12a, the keyboard 24 and the pointing device 25 are concealed from the outside of the tablet PC 2. In the second position, the display screen 12a, the keyboard 24 and the pointing device 25 are exposed to the outside.

It should be noted that even if the tablet PC 2 according to the first embodiment as shown in FIG. 1 is reversed, it can be attached to the dock 3. That is, the tablet PC 2 can be attached to the dock 3, even with the display screen 12a located to face in the same direction as the keyboard 24 faces. Also, the tablet PC 2 can be folded such that it is laid over the main body 21 of the dock 3, with the display screen 12a attached to the dock 3 and located to face in the same direction as the keyboard 24.

By virtue of the above structure, the tablet PC 2 can be laid over the main body 21 of the dock 3, with the display screen 12a located to face upwards. Also, the tablet PC 2 can receive an input operation to the display screen 12a, while it is laid over the dock 3, with the display screen 12a located to face upwards.

Next, a connection structure between the tablet PC 2 and the dock 3 will be explained in detail.

Figure 4:
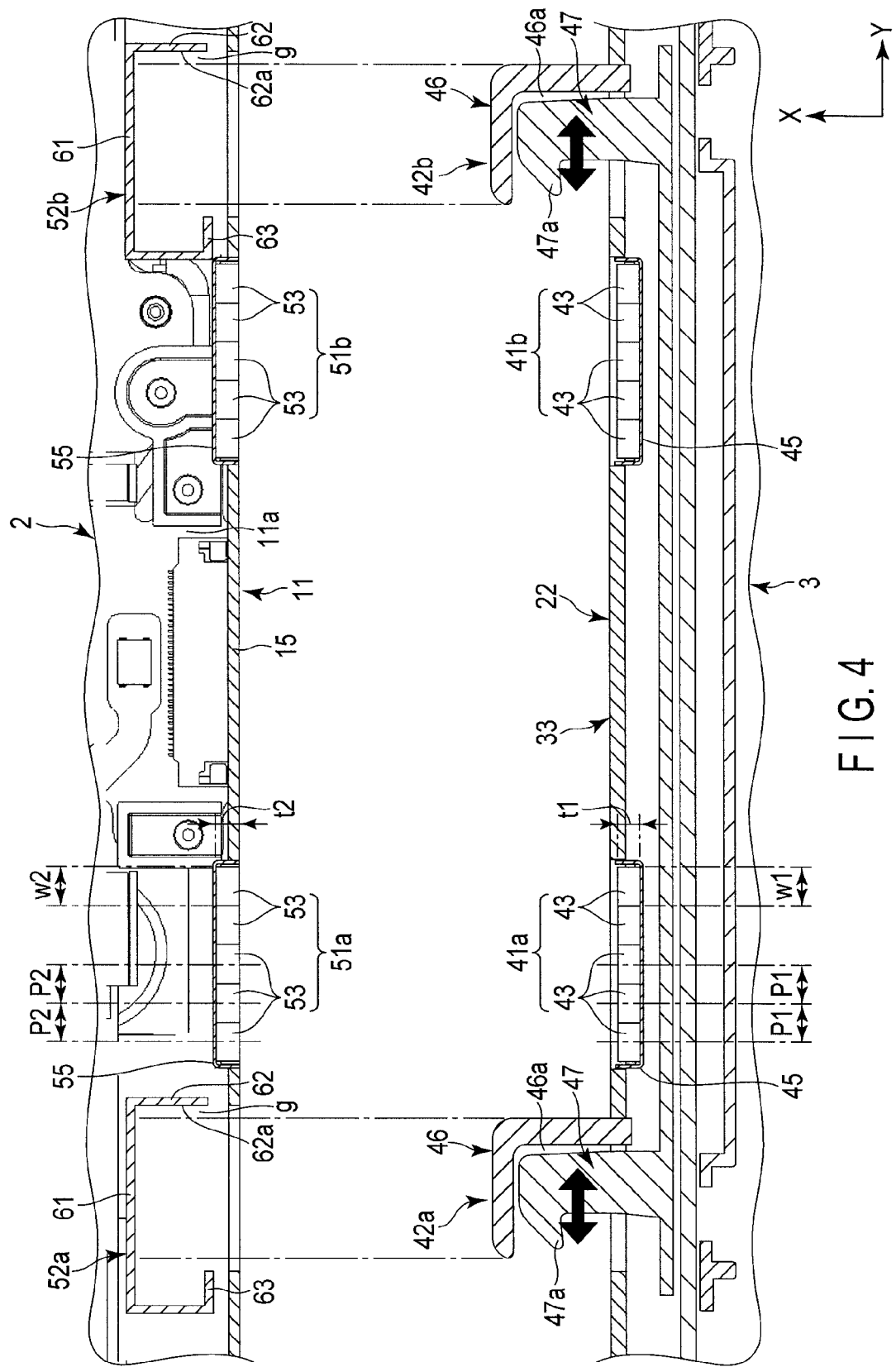
FIG. 4 is an exemplary sectional view of a connection structure of the table set shown in FIG. 1.
Figure 5:
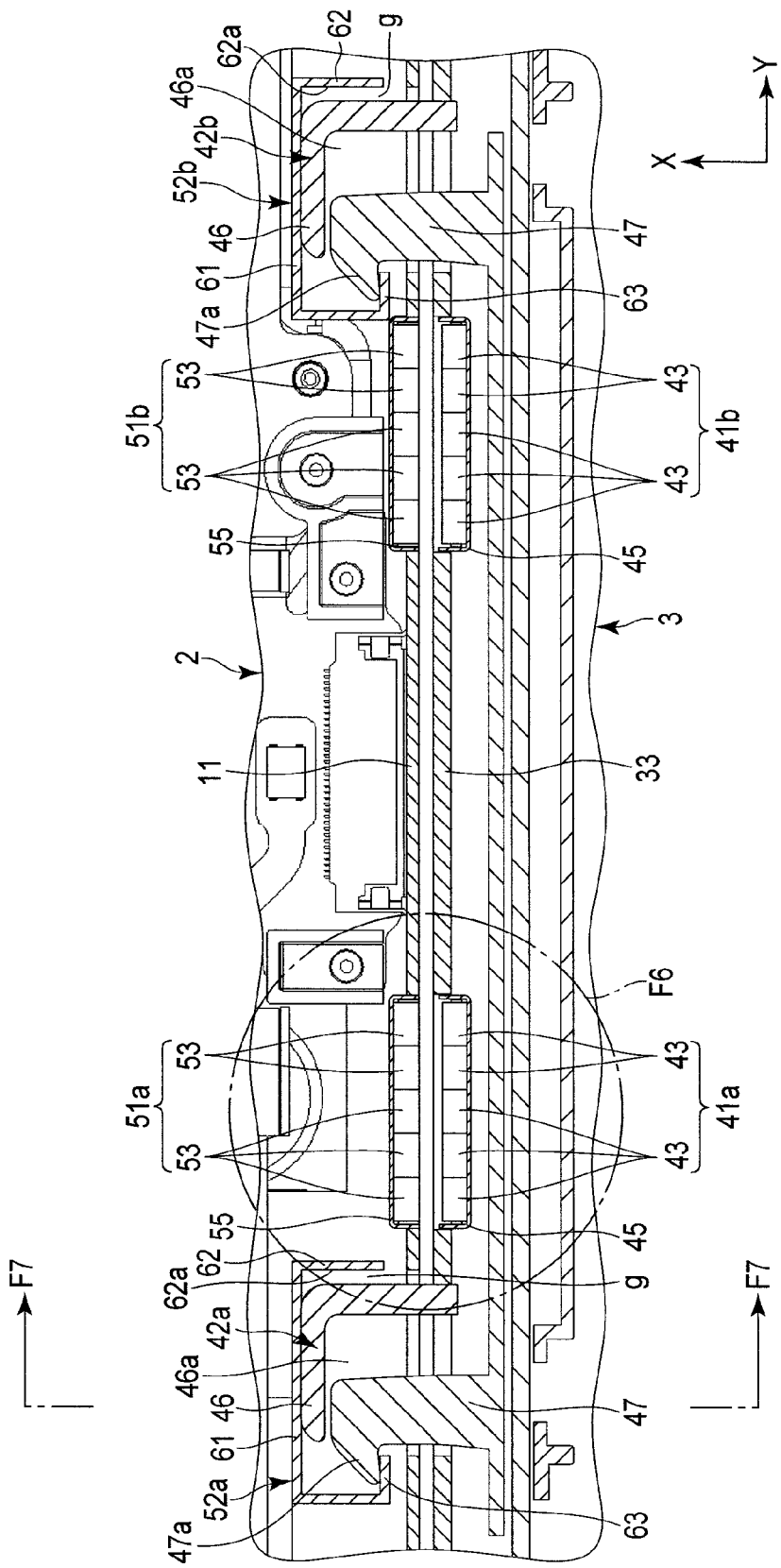
FIG. 5 is another exemplary sectional view of the connection structure of the table set shown in FIG. 1.

As shown in FIGS. 4 and 5, the housing 33 of the rotation portion 22 of the dock 3 comprises a pair of first magnetic sets 41a and 41b (i.e., magnetic modules or magnetic-force portions) and a pair of engagement portions 42a and 42b (i.e., projections, positioning portions, or first engagement portions). The pair of first magnetic sets 41a and 41b are located opposite to each other with respect to, e.g., the center of the housing 33. Each of the first magnetic sets 41a and 41b comprises a plurality of (e.g., three or more) first magnets 43.

The first magnets 43 are formed compact to have a width w1 of 10 mm or less to, e.g., reduce the influence of a magnetic field. The first magnets 43 are in a flat shape, and the width w1 of each of the first magnets 43 in a direction (i.e., a second direction Y which will be described later) where the first magnets 43 are arranged is greater than a length t1 (i.e., thickness) of each first magnet 43 in a direction (i.e., a first direction which will be described later) from the dock 3 toward the tablet PC 2. The first magnets 43 have substantially the same size, and are arranged in parallel with each other. In the first embodiment, for example, five first magnets 43 are arranged adjacent to each other.

Figure 6:
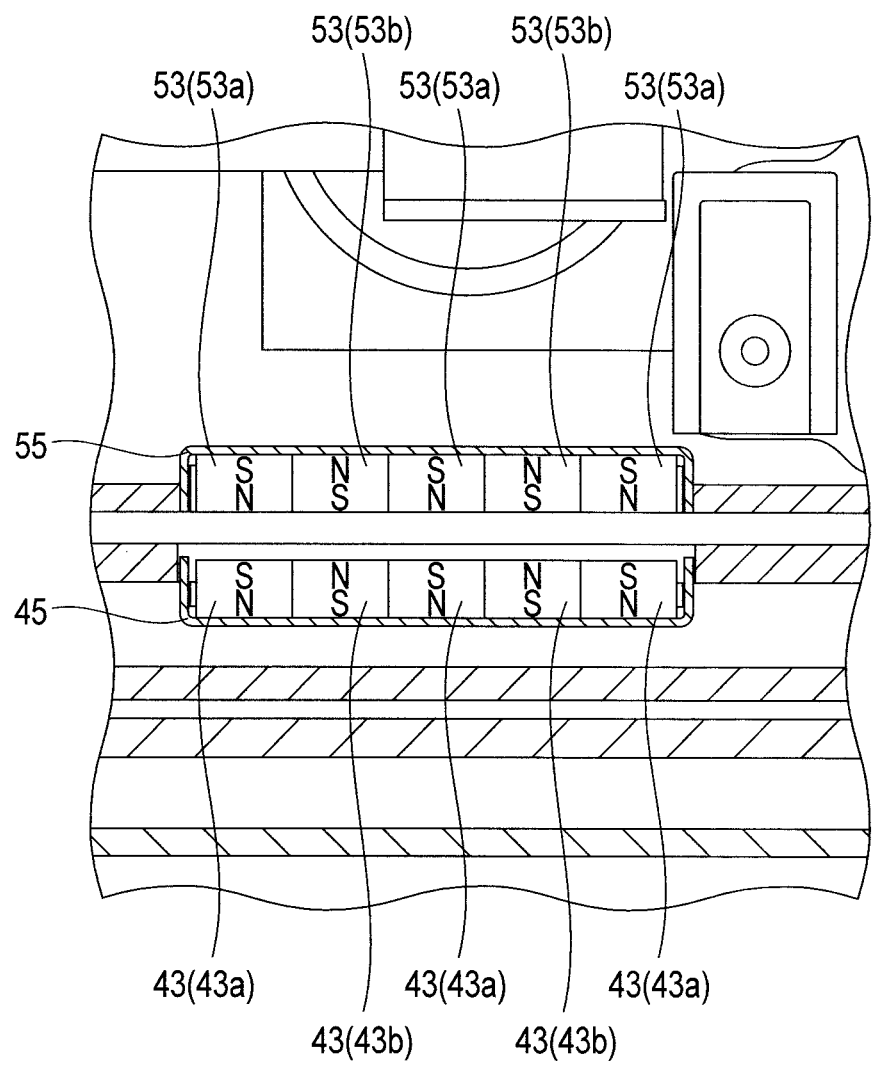
FIG. 6 is an exemplary enlarged sectional view of part of the connection structure surrounded by line F6 in FIG. 5.

As shown in FIG. 6, south poles and north poles of the first magnets 43 face in a direction from the dock 3 toward the tablet PC 2 or in the opposite direction to the above direction. That is, in each of the first magnets 43, either the south pole or the north pole faces the tablet PC 2. In other words, the south pole and north pole of each of the first magnets 43 separate in a direction from the dock 3 toward the tablet PC 2 or in the opposite direction to the above direction.

The first magnets 43 are arranged such that the facing directions of the south pole and north pole of each first magnet 43 are opposite to those of any adjacent first magnet 43. TO be more specific, the first magnets 43 have first magnets 43a whose south poles face the tablet PC 2 and first magnets 43b whose north poles face the tablet PC 2, and the first magnets 43a and the first magnets 43b are alternately arranged.

As shown in FIG. 4, shields 45 are provided around peripheral portions of the first magnetic sets 41a and 41b. The shields 45 are, e.g., metal plates. Each of the shields 45 covers five surfaces of an associated one of the first magnetic sets 41a and 41b, except for a surface of the associated magnetic set which faces the tablet PC 2 (i.e., it covers the associated magnetic set in five directions). This can reduce the influence of a magnetic field acting toward the inside of the dock 3 and also enhance a magnetic field acting toward the tablet PC 2. Thereby, even if small magnets are applied as the first magnets 43, they can ensure a sufficiently strong magnetic field acting toward the tablet PC 2.

As shown in FIG. 4, the pair of engagement portions 42a and 42b are located outward of, e.g., the first magnetic sets 41a and 41b. The engagement portions 42a and 42b project from the housing 33 toward the tablet PC 2. In the first embodiment, the engagement portions 42a and 42b comprise guides 46 (e.g., guide pins) and hooks 47.

Figure 7:
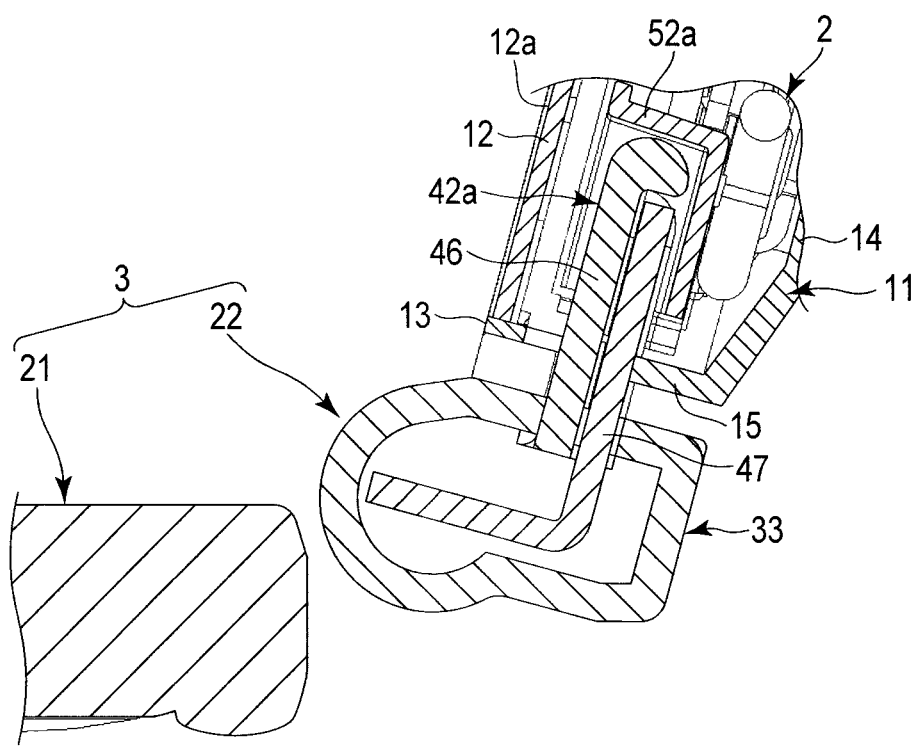
FIG. 7 is an exemplary sectional view of the connection structure taken along line F7-F7 in FIG. 5.

As shown in FIGS. 4, 5 and 7, the guides 46 are projections projecting from the housing 33 toward the tablet PC 2. The guides 46 comprise accommodation portions 46a. The accommodation portions 46a are, e.g., hollows provided at the inner surfaces of the guides 46, and open in the lateral direction of the guides 46. The hooks 47 are located in the accommodation portions 46a of the guides 46. The guides 46 cover the hooks 47 located at the accommodation portions 46a.

As indicated by an arrow in FIG. 4, the hooks 47 can be moved to a first position in which they are located in the accommodation portions 46a and a second position in which at least portions (e.g., engagement portions 47a) of the hooks 47 laterally project to the outside of the guides 46 as a result of lateral movement of the hooks 47 from the inside of the accommodation portions 46a. The guides 46 of the pair of engagement portions 42a and 42b are moved together with each other, while they are coupled to each other in the housing 33, for example.

The hooks 47 are located in the accommodation portions 46a of the guides 46, for example, before the tablet PC 2 is attached to the dock 3; i.e., they do not project to the outsides of the guides 46. Thus, when the tablet PC 2 is attached to the dock 3, the hooks 47 do not interfere with the tablet PC 2. On the other hand, when the tablet PC 2 is attached to the dock 3, the hooks 47 project from the guides 46, and engage with the tablet PC 2. This prevents the tablet PC 2 from being detached from the dock 3.

It should be noted that instead of the above structure, a structure may be made in which the hooks 47 projects to the outside of the guides 46, for example, before the tablet PC 2 is attached to the dock 3, and they retreat into the accommodation portions 46a of the guides 46 only when the tablet PC 2 is attached to the dock 3. This structure can also prevent the tablet PC 2 from being detached from the dock 3, since the hooks 27 project from the insides of the guides 46 to engage with the tablet PC 2 upon attachment of the tablet PC 2 to the dock 3.

On the other hand, at the first end 11a of the housing 11 of the tablet PC 2, as shown in FIGS. 4 and 5, a pair of second magnetic sets 51a and 51b (i.e., magnetic modules or magnetic-force portions) and a pair of a pair of receivers 52a and 52b (i.e., reception portions, attachment portions, positioning portions, or second engagement portions) are provided. The pair of second magnetic sets 51a and 51b, for example, are located opposite to each other with respect to the center of the first end 11a of the housing 11. The second magnetic sets 51a and 51b each comprise a plurality of second magnets 53 (e.g., three or more second magnets 53).

The second magnets 53 are each made small to have a width w2 of 10 mm or less, in order to reduce, e.g., the influence of the magnetic field. The second magnets 53 are in a flat shape, and the width w2 of each second magnet 53 in the direction of arrangement of the second magnets 53 (which corresponds to the second direction Y as described later) is greater than a length t2 (i.e., thickness) of each second magnet 53 in the direction from the dock 3 toward the tablet PC 2 (which corresponds to the first direction as described later). The second magnets 53 have substantially the same size, and are arranged in parallel with each other. In the first embodiment, for example, five second magnets 53 are arranged adjacent to each other.

As shown in FIG. 6, the second magnets 53 have south poles and north poles which face in a direction from the dock 3 toward the tablet PC 2 or in the opposite direction to the above direction. That is, either the south pole or the north pole of each of the second magnets 53 faces the dock 3. In such a manner, the south poles and north poles of the second magnets 53 separate in the direction from the dock 3 toward the tablet PC 2 or in the opposite direction to the above direction.

To be more specific, the second magnets 53 are arranged such that the south pole and north pole of one of any adjacent two of the second magnets 53 face in opposite directions to the facing directions of those of the other. That is, the second magnets 53 comprise second magnets 53a whose north poles face the dock 3 and second magnets 53b whose south poles face the dock 3, and the second magnets 53a and the second magnets 53b are alternately arranged.

As shown in FIG. 6, the second magnets 53 face the first magnets 43. To be more specific, they face each other such that opposite poles face each other. That is, the north poles of the second magnets 53a face the south poles of the first magnets 43a, and the south poles of the second magnets 53b face the north poles of the first magnets 43b. By virtue of this structural feature, a force of attraction generates between the first magnetic sets 41a and 41b and the second magnetic sets 51a and 51b, fixing the tablet PC 2 and the dock 3 to each other.

As shown in FIG. 6, shields 55 are provided around peripheral portions of the second magnetic sets 51a and 51b. The shields 55 are, e.g., metal sheets. Also, each of the shields 55 cover five surfaces of an associated one of the second magnetic sets 51a and 51b, except for a surface of the associated magnetic set which faces the dock 3 (i.e., it covers the associated magnetic set in five directions). This can reduce the influence of a magnetic field acting toward the inside of the tablet PC 2 and also enhance a magnetic field acting toward the dock 3. Thereby, even if small magnets are applied as the second magnets 53, they can ensure a sufficiently strong magnetic field acting toward the dock 3.

As shown in FIGS. 4 and 5, the pair of receivers 52a and 52b are located outward of, e.g., the second magnetic sets 51a and 51b, and face the engagement portions 42a and 42b of the dock 3. Also, the receivers 52a and 52b comprise recesses to allow the engagement portions 42a and 42b to be inserted into the receivers 52a and 52b. The engagement portions 42a and 42b are inserted into the receivers 52a and 52b in a first direction X directing from the dock 3 toward the tablet PC 2.

The receivers 52a and 52b comprise first portions 61, second portions 62 and third portions 63.

The first portions 61 are located at deepest portions (e.g., uppermost portions) of the receivers 52a and 52b, and face the engagement portions 42a and 42b in the first direction X. The first portions 61 cover and protect the hooks 47.

The second portions 62 extend from, e.g., ends of the first portions 61 toward the outside of the housing 11 in the first direction X. Inner surfaces 62a of the second portions 62 face the engagement portions 42a and 42b in a second direction Y crossing (e.g., substantially perpendicular to) the first portions 61. The second direction Y is a direction in which for example, the first magnets 43 are arranged and also the second magnets 53 are.

Thus, for example, if the engagement portions 42a and 42b are displaced from their positions by a predetermined distance or more in the second direction Y, they come into contact with the second portions 62, thus stopping their movement in the second direction Y. Thereby, the second portions 62 prevent the displacement of the tablet PC 2 in the second direction Y. Thus, when the engagement portions 42a and 42b are inserted into the receivers 52a and 52b, first positioning of the tablet PC 2 and the dock 3 is performed (i.e., they are positioned with respect to each other).

It should be noted that the gaps g between the engagement portions 42a and 42b and the receivers 52a and 52b are smaller than the distances P1 between the centers of the first magnets 43, and also smaller than the distances P2 between the centers of the second magnets 53. The distance between the centers is the distance (i.e., pitch) between the center lines of any adjacent two magnets. In the first embodiment, the distance between the centers is substantially equal to the widths w1 of the first magnets 43 in the second direction Y and the width w2 of the second magnets 53 in the second direction Y.

As shown in FIG. 5, when the engagement portions 42a and 42b are inserted into the receivers 52a and 52b, the hooks 47 are moved in the second direction Y to project from the guides 46. When the hooks 47 project, the third portions 63 of the receivers 52a and 52b are located between engagement portions 47a of the hooks 47 and the dock 3. The third portions 63 face the engagement portions 47a of the hooks 47 in the first direction X. As a result, the engagement portions 47a of the hooks 47 are hooked by the third portions 63, preventing the tablet PC 2 from being detached from the dock 3.

Next, a stand 71 will be explained in detail.

Figure 3:
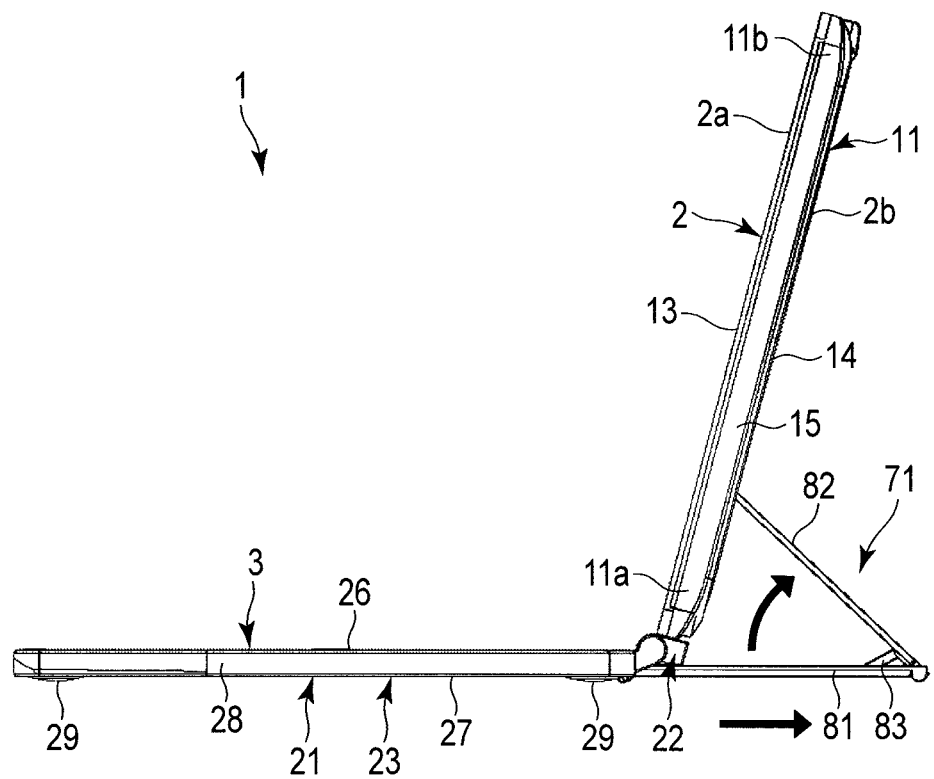
FIG. 3 is an exemplary side view of an opened state of the table set shown in FIG. 1.
Figure 9:
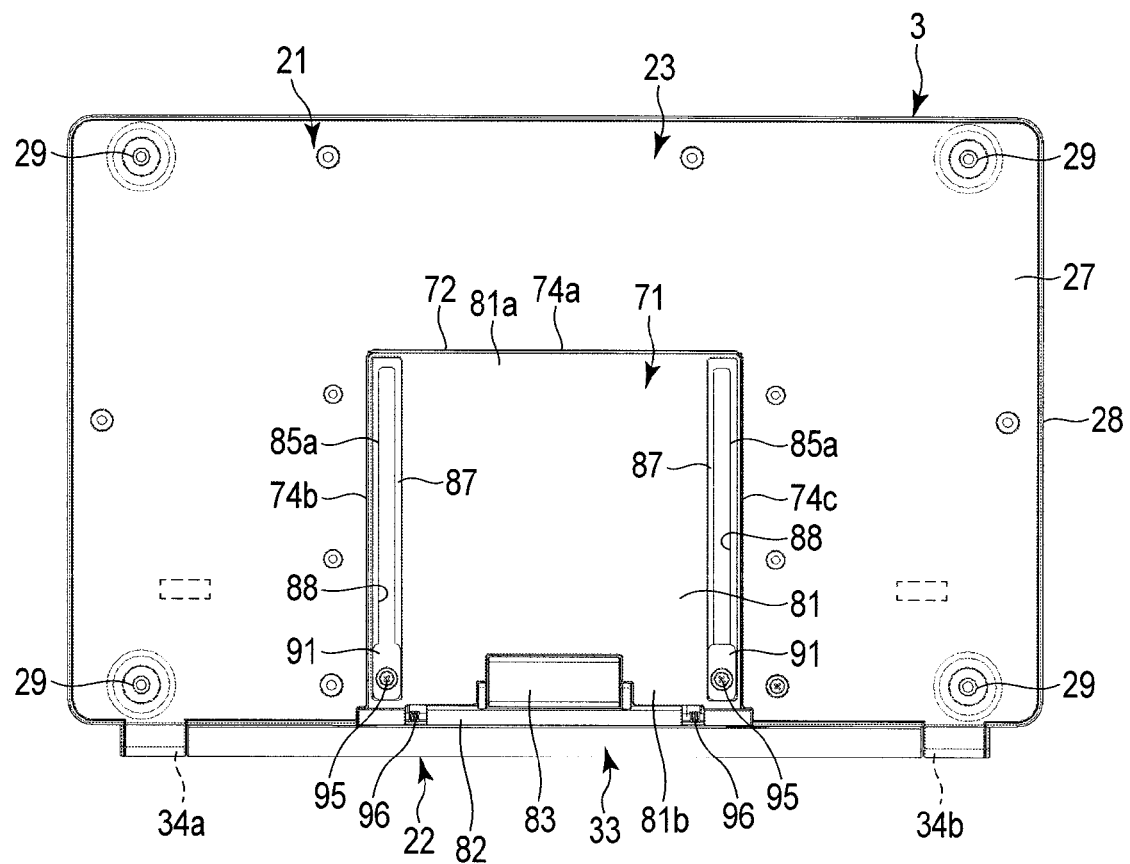
FIG. 9 is an exemplary view showing a bottom surface of the dock shown in FIG. 1.
Figure 10:
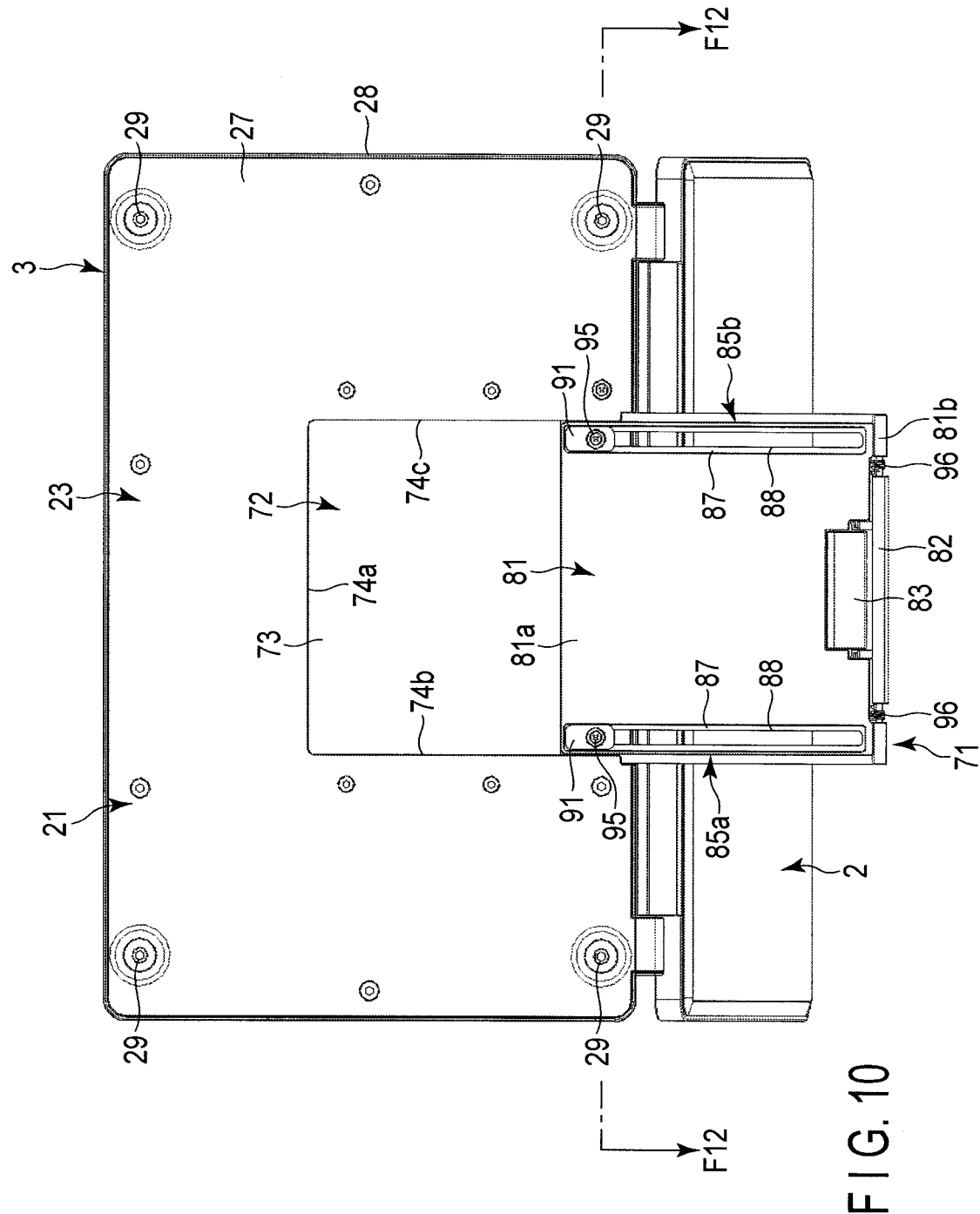
FIG. 10 is another exemplary view showing the bottom surface of the dock shown in FIG. 1.

As shown in FIGS. 3 and 8, the dock 3 comprises a folding stand 71. The stand 71 is an example of "supporter". As shown in FIGS. 9 and 10, the stand 71 is movable between a first position where it is located within the area of a housing 23 of the dock 3 and a second position where it is pulled out rearward with respect to the housing 23.

To be more specific, the bottom wall 27 of the housing 23 comprises an accommodation portion 72 (e.g., recess) for accommodating the stand 71. The accommodation portion 72 is recessed toward the inside of the housing 23. In the first position, the stand 71 is folded, and accommodated in the accommodation portion 72 of the housing 23. That is, in the first position, the stand 71 is covered by the bottom wall 27 of the housing 23. In the second position, the stand 71 is pulled out to the outside of the housing 23 and expanded.

Figure 11:
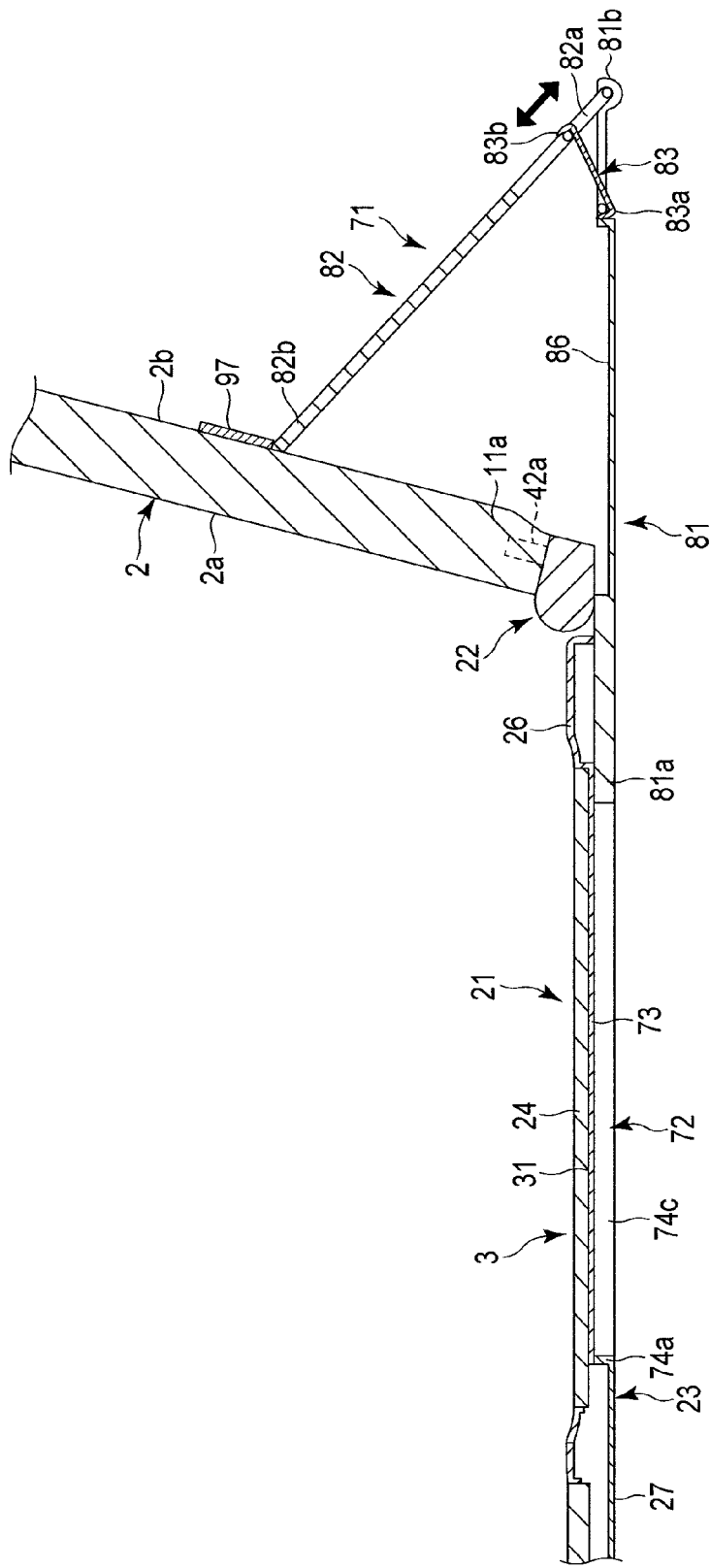
FIG. 11 is an exemplary sectional view of the tablet set shown in FIG. 1.

As shown in FIG. 10, the accommodation portion 72 comprises a ceiling wall 73 and three standing walls 74a, 74b and 74c. As shown in FIG. 11, the ceiling wall 73 is constituted by part of the upper wall 26. In this embodiment, it can be said that the ceiling wall 73 is constituted by a keyboard attachment portion 31. That is, the keyboard 24 is directly mounted on an upper surface of the ceiling wall 73.

As shown in FIG. 10, the three standing walls 74a, 74b and 74c are provided at a front end, a left end and a right end of the ceiling wall 73. That is, the three standing walls 74a, 74b and 74c surround the accommodation portion 72 in three directions, and are continuous with each other.

As shown in FIG. 11, the standing walls 74a, 74b and 74c stand to extend upwards from the bottom wall 27 to contact the ceiling wall 73. In other words, the standing walls 74a, 74b and 74c supports the ceiling wall 73, thus also supporting the keyboard 24, with the ceiling wall 73 interposed between the standing walls 74a, 74b and 74c and the keyboard 24.

The standing walls 74a, 74b and 74c have high stiffness against a force acting in a vertical direction, since they stand in a substantially vertical direction. Thus, the standing walls 74a, 74b and 74c can carry a force acting on the keyboard 24, from below the keyboard 24, at the time of performing inputting on the keyboard 24. That is, in the first embodiment, the standing walls 74a, 74b and 74c of the accommodation portion 72 improve the stiffness of the housing 23, thus supporting the keyboard 24.

As shown in FIGS. 8 to 11, the stand 71 comprises a first member 81, a second member 82 and a third member 83. The first member 81 is slidably attached to the bottom wall 27 of the housing 23. Also, the first member 81 can be slid in substantially parallel with a surface on which the dock 3 is placed (also in substantially parallel with the upper wall 26) between the first position and the second position.

As shown in FIGS. 8 and 10, the first member 81 comprises, e.g., a pair of rail portions 85a and 85b and a recess 86 (i.e., an accommodation portion). The pair of rail portions 85a and 85b are provided at left and right ends of the first member 81, and extend in a sliding direction of the first member 81. At lower surfaces of the rail portions 85a and 85b, grooves 87 (i.e., step portions) are provided to extend in the sliding direction of the first member 81. At part of the bottom wall 27 which corresponds to the grooves 87, first holes 88 are provided to extend in the sliding direction of the first member 81.

Figure 12:
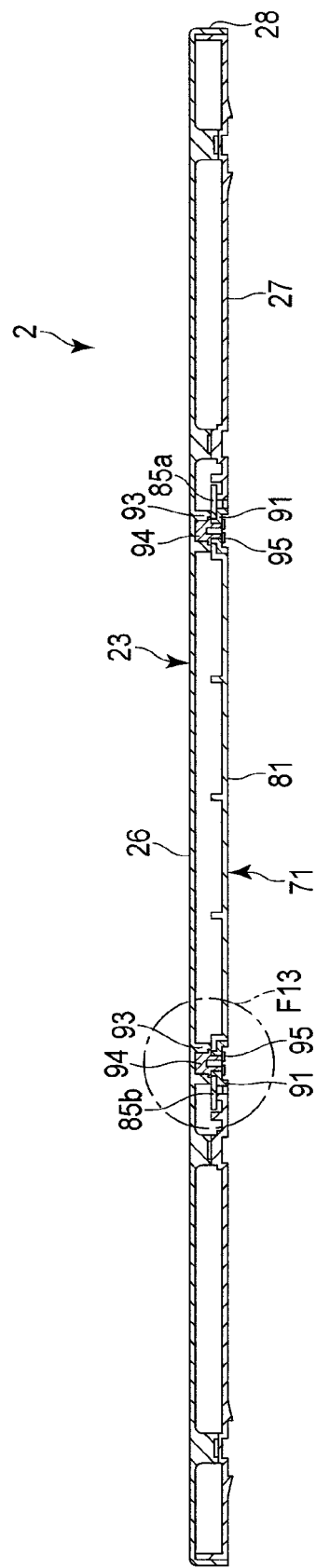
FIG. 12 is an exemplary sectional view of the dock taken along line F12-F12 in FIG. 10.
Figure 13:
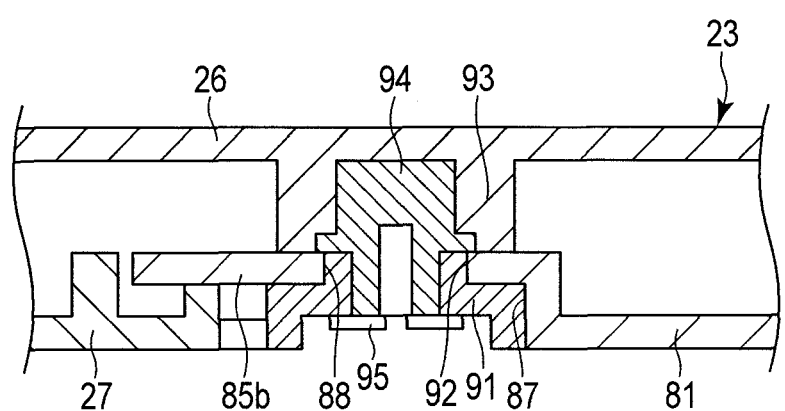
FIG. 13 is an exemplary enlarged sectional view of part of the dock surrounded by line F13 in FIG. 12.

As shown in FIGS. 9, 10, 12 and 13, at lower portions of the rail portions 85a and 85b, holding members 91 (i.e., supporting members) are provided. The holding members 91 are provided in the grooves 87 and fitted in steps thereof. As shown in FIG. 13, the holding members 91 are partially inserted into the first holes 88. Also, portions of the holding members 91 inserted into the first holes 88 include second holes 92.

As shown in FIGS. 12 and 13, at inner surfaces of the upper wall 26 of the housing 23, supporting portions 93 (e.g., projections) are provided to project toward the first member 81 and face the rail portions 85a and 85b. The rail portions 85a and 85b are supported between the holding members 91 and supporting portions 93. To be more specific, to the supporting portions 93, attachment members 94 are fixed. The attachment members 94 project downwards to be inserted in the first holes 88 of the rail portions 85a and 85b.

In the first embodiment, the attachment members 94 are also inserted in the second holes 92 of the holding members 91 and exposed below the rail portions 85a and 85b. To the attachment members 94, screws 95 (i.e., fixing members) are attached. The screws 95 fix the holding members 91 to the attachment members 94. Thereby, the rail portions 85a and 85b are slidably supported by the holding members 91 from below.

As shown in FIG. 8, the recess 86 of the first member 81 is provided between the pair of rail portions 85a and 85b. Also, the recess 86 is recessed in a direction from the rail portions 85a and 85b toward the surface on which the dock is placed, and extend in substantially parallel with the surface. Furthermore, the recess 86 is an accommodation portion for accommodating the second member 82.

As shown in FIG. 11, the first member 81 comprises a first end 81a and a second end 81b. The first end 81a is a front end; and in the first position, it is located below the keyboard 24, and in the second position, located below a rear end of the housing 23. The second end 81b is a rear end, and located opposite to the first end 81a. In the second position, the second end 81b is pulled out to the rear of the housing 23.

The second member 82 comprises a first end 82a and a second end 82b. The first end 82a is a read end, and located adjacent to the second end 81b of the first member 81. The first end 82a is rotatably attached to the second end 81b of the first member 81. The second end 82b is a front end, and located opposite to the first end 82a.

As shown in FIG. 14, springs 96 are provided between the second end 81b of the first member 81 and the first end 82a of the second member 82. The springs 96 are, e.g., twisted coil springs. The springs 96 apply an elastic force to cause the second end 82b of the second member 82 to be rotated in a direction away from the first member 81.

To be more specific, the stand 71 is deformable between a first state in which the second member 82 is folded and laid over the first member 81 against the elastic force of the springs 96 and a second state in which the second member 82 are rotated (i.e., expanded) away from the first member 81 by the springs 96.

As shown in FIG. 11, in the second state, the second member 82 is inclined with respect to the first member 81, and the second end 82b of the second member 82 contacts a second surface 2b of the tablet PC 2 to support the second surface 2b of the tablet PC 2 from the rear thereof. Thereby, the tablet PC 2 does not easily fall down rearward, and a front end of the dock 3 does not easily move upwards.

The second surface 2b of the table PC comprises an engagement portion 97 to be engaged with the second end 82b of the second member 82. The engagement portion 97 may be a projection, a recess, or a region having a greater frictional resistance than that of another region of the second surface 2b. An example of the engagement portion 97 is a logo plate provided on the second surface 2b of the tablet PC 2.

As shown in FIG. 11, the third member 83 is provided to extend between an intermediate portion of the first member 81 and an intermediate portion of the second member 82. The third member 83 comprises a first end 83a rotatably attached to the first member 81 and a second end 83b rotatably attached to the second member 82. The second end 83b, as indicated by an arrow in FIG. 11, is movable along an outline of the second member 82 without projecting from the second member 82.

When the second member 82 is rotated relative to the first member 81 by a predetermined angle or more, the third member 83 is pulled between the first member 81 and the second member 82, stopping the movement of the second member 82. As a result, the angle of the second member 82 rotated is determined. That is, the third member 83 is a stopper for restricting the rotation and angle of the second member 82.

Next, operations of the tablet PC 2 and the dock 3 will be explained.

In the case of attaching the tablet PC 2 to the dock 3, first, the receivers 52a and 52b of the tablet PC 2 are positioned with respect to the engagement portions 42a and 42b of the dock 3, and the engagement portions 42a and 42b are inserted into the receivers 52a and 52b. When distal ends of the engagement portions 42a and 42b are inserted into the receivers 52a and 52b, first positioning of the tablet PC 2 and the dock 3 is effected. As a result, the first magnetic sets 41a and 41b and the second magnetic sets 51a and 51b face each other to attract them to each other.

Furthermore, when the engagement portions 42a and 42b are further deeply inserted into the receivers 52a and 52b, the tablet PC 2 is attracted toward the dock 3 by the force of attraction between the first magnetic sets 41a and 41b and the second magnetic sets 51a and 51b. Then, the first magnetic sets 41a and 41b and the second magnetic sets 51a and 51b effect positioning with a higher precision, and fix the tablet PC 2 and the dock 3 to each other.

When the engagement portions 42a and 42b are inserted into the receivers 52a and 52b, the hooks 47 project from the guides 46, and are hooked onto the third portions 63 of the engagement portions 42a and 42b. Thereby, the tablet PC 2 is not detached from the dock 3. At this time, the force of attraction between the first magnetic sets 41a and 41b and the second magnetic sets 51a and 51b restricts rattling of the engagement portions 42a and 42b and the receivers 52a and 52b.

The stand 71 is accommodated in the accommodation portion 72 of the housing 23 of the dock 3, while it is folded, i.e., the second member 82 is laid over the first member 81, and the springs 96 are elastically deformed. After or before attaching the tablet PC 2 to the dock 3, the user can pull out the stand 71 from the accommodation portion 72 of the housing 23.

When the stand 71 is pulled out from the accommodation portion 72 of the housing 23, it is automatically expanded by the springs 96. To be more specific, the second member 82 is rotated with respect to the first member 81 by the springs 96, and the second end 82b of the second member 82 become able to support the second surface 2b of the tablet PC 2. When the second surface 2b of the tablet PC 2 is supported by the stand 71, the tablet PC 2 does not easily fall down rearwards, and the front end of the dock 3 does not easily move upwards.

Furthermore, the user can fold the stand 71 and have the stand 71 accommodated in the accommodation portion 72 of the housing 23, by pushing the second member 82 toward the first member 81. Due to this feature, the outer appearances of the tablet PC 2 and the dock 3 become simple and improved.

By virtue of the above structure, the reliability of the electronic apparatus can be improved. It should be noted that for example, the display device 12 is an example of an electronic component which may be affected by a magnetic field. If the influence of the magnetic field is great, the display device 12 may recognize a position displaced from an actual input position of, e.g., a digitizer pen.

However, the dock 3 according to the first embodiment comprises first magnets 43 which have substantially the same size, and whose south and north poles face in a direction from the dock 3 toward the tablet PC 2 or an opposite direction to the above direction, and the first magnets 43 are arranged such that the south and north poles of one of any adjacent two of the first magnets 43 face in opposite directions to facing directions of the south pole and north pole of the other.

As stated above, the south and north poles of the first magnets 43 are alternately arranged, as a result of which forces of attraction generated are kept substantially equal, and a magnetic field generated is made smaller, as compared with the case of providing a single large magnet. To be more specific, if a single large magnet is provided, it generates a large magnetic field. On the other hand, in the case where a plurality of first magnets 43 are provided such that their south and north poles are alternately arranged, they generate a plurality of small magnetic fields, reducing the range over which the magnetic fields have an influence.

Similarly, the second magnets 53 of the tablet PC 2 according to the first embodiment face the first magnets 43, and have south poles and north poles which are arranged such that the south poles face the north poles of the first magnets 43 and the north poles face the south poles of the first magnets 43. The south and north poles of the second magnets 53 are alternately arranged, reducing the range over which a magnetic field generated has an influence.

Thus, according to the first embodiment, the electronic components provided at the tablet PC 2 and the dock 3 are not easily affected by the magnetic field, as a result of which the reliability of the operation is improved, thus also improving the reliability of the electronic apparatus.

In the first embodiment, each of the number of the first magnets 43 and that of the second magnets 53 is three or more. In this structure, magnetic lines of force between three or more magnets do not cancel each other. Thus, a relatively strong magnetic force (i.e., force of attraction) can be ensured, while reducing the influence of the magnetic field.

It should be noted that in the case where the south poles and north poles of the first magnets 43 are arranged such that the south poles face the north poles of the second magnets 53 and the north poles face the south poles of the second magnets 53, if the tablet PC 2 and the dock 3 are not properly positioned, the first magnets 43 and the second magnets 53 may attract each other such that each of the first magnets 43 may attract an incorrect one of the second magnets 53 which is offset by two positions. The possibility with which this will occur increases as the sizes of the first magnets 43 and the second magnets 53 are made smaller in order to reduce the influence of the magnetic field.

However, in the first embodiment, the tablet PC 2 comprises the receivers 52a and 52b; and the dock 3 comprises the engagement portions 42a and 42b which are inserted into the receivers 52a and 52b in the first direction from the dock 3 toward the table PC 2, and which face the inner surfaces 62a of the receivers 52a and 52b in the second direction Y where the first magnets 43 are arranged.

Due to provision of the above receivers 52a and 52b and engagement portions 42a and 42b, first positioning of the tablet PC 2 and the dock 3 is properly performed, thus enabling the first magnets 43 and the second magnets 53 to face each other in their proper positions. This can prevent displacement of the tablet PC 2 and the dock 3, and also improve the usability thereof. It should be noted that each of the number of the receivers 52a and 52b and that of the engagement portions 42a and 42b may be one.

In the first embodiment, the gap g between the engagement portions 42a and 42b and the receivers 52a and 52b in the second direction Y is smaller than the distance P1 between the centers of the first magnets 43. By virtue of this structure, the amount of displacement which occurs due to the gap g between the engagement portions 42a and 42b and the receivers 52a and 52b is smaller than the distance P1 between the centers of the first magnets 43. This can more reliably prevent mis-attraction of the magnets 43 and 53, i.e., prevent, when the magnets 43 and 53 attract each other, each of the magnets 43 from attracting one of the magnets 53 which is offset by two positions.

In the first embodiment, the engagement portions 42a and 42b comprise the guides 46 which are inserted into the receivers 52a and 52b in the first direction X, and the hooks 47 which are moved and projected from the guides 46 in the second direction Y, with a force of attraction generated between the first magnets 43 and the second magnets 53, thus engaging with the receivers 52a and 52b. By virtue of this structure, a fixing structure using the magnets 43 and 53 is reinforced with the hooks 47, thus preventing the tablet PC 2 from being detached from the dock 3. This can further improve the usability.

In the first embodiment, the tablet PC 2 comprises the first surface 2a including the display screen 12a exposed and the second surface 2b located opposite to the first surface 2a. The dock 3 comprises the stand 71 and the housing 23 in which the accommodation portion 72 is provided. The stand 71 can be moved between the first position in which it is folded in the accommodation portion 72 of the housing 23 and the second position in which it is pulled out from the housing 23, and supports the second surface 2b of the tablet PC 2, with a force of attraction generated between the first magnets 43 and the second magnets 53.

In the above structure, the tablet PC 2 can be supported by the stand 71, which is of a pull-down type. Thereby, the tablet PC 2 does not easily fall down rearward, and the front end of the dock 3 does not easily move upwards. Furthermore, since the stand 71 is of a pull-down type, the tablet PC 2 and the dock 3 can be made thin and also made to have flat surfaces.

In the first embodiment, the stand 71 comprises the first member 81 which is moved in substantially parallel with the upper wall 26 of the housing 23, and the second member 82 which is rotatably attached to the first member 81, and inclined relative to the first member 81 to support the second surface 2b of the tablet PC 2. Due to this structure, the thickness of the stand 71 folded is small.

In the first embodiment, the stand 71 comprises the springs 96 provided between the first member 81 and the second member 82. The stand 71 is accommodated in the accommodation portion 72 of the housing 23, with the springs 96 elastically deformed. When the stand 71 is pulled out from the housing 23, the second member 82 is rotated by the springs 96 with respect to the first member 81. The above stand 71 can be made with a relatively simple structure as a stand which is automatically expanded when being pulled out from the housing 23.

Second Embodiment

Figure 15:
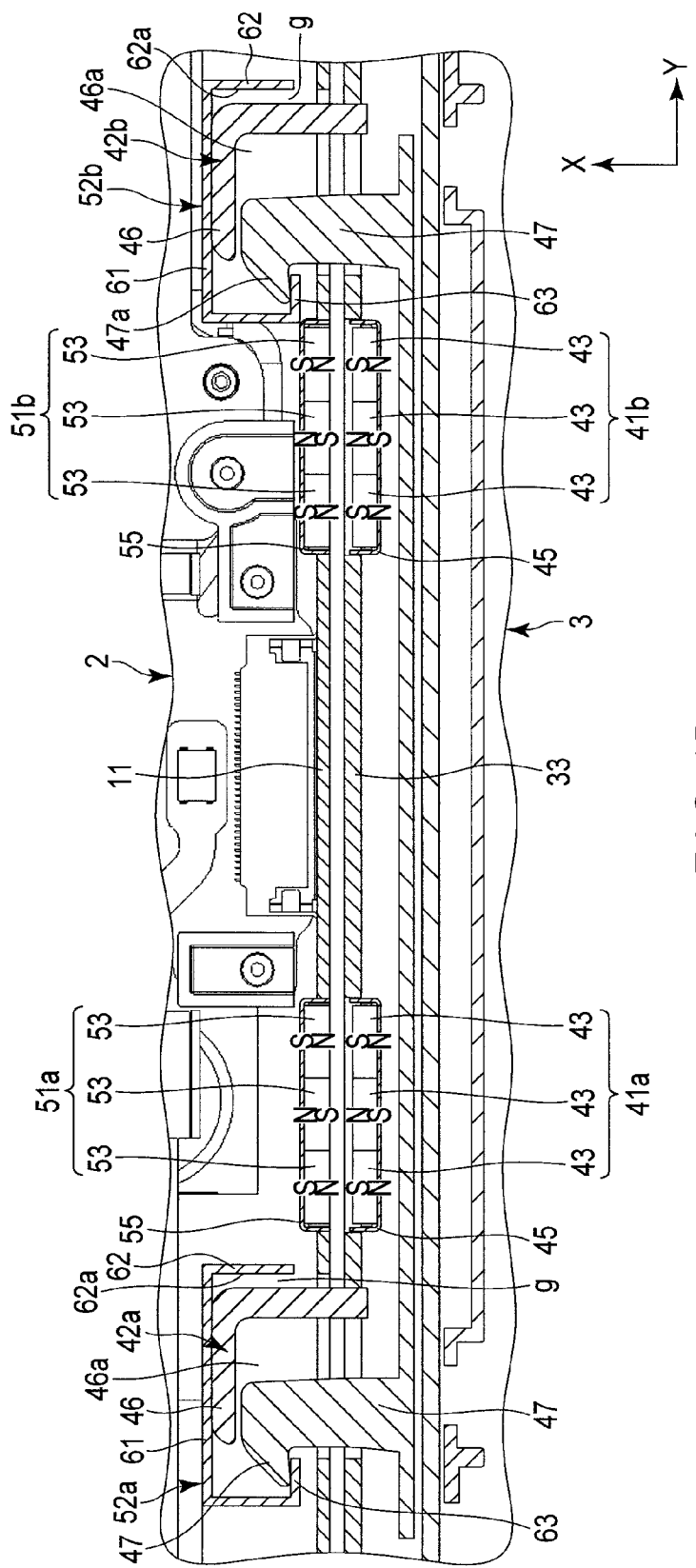
FIG. 15 is an exemplary sectional view of a connection structure of a table set according to a second embodiment.

The tablet set 1 according to the second embodiment will be explained with reference to FIG. 15. It should be noted that with respect to the second embodiment, structural elements having the same or similar structural features as or to structural elements in the first embodiment will be denoted by the same reference numerals as in the first embodiment, and their explanations will be omitted. The structural features of the tablet set 1 according to the second embodiment are the same as those according to the first embodiment, except the following structural feature:

As shown in FIG. 15, in the second embodiment, the first magnetic sets 41a and 41b each comprise, e.g., three first magnets 43, and the second magnetic sets 51a and 51b each comprise, e.g., three second magnets 53. This structure can also improve the reliability of the electronic apparatus to substantially the same degree as in the first embodiment. It should be noted that each of the number of the first magnets 43 and that of the second magnets 53 may be, e.g., four or more.

The present invention is not limited to the above embodiments, and may be modified without departing from the subject matter of the invention when it is put to practical use. Also, various embodiments can be made by appropriately combining structural elements disclosed above with respect to the embodiments. For example, some of all the structural elements disclosed with respect to the embodiments may be omitted. Furthermore, structural elements of different embodiments may be combined as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first unit;
a second unit configured to be detachably coupled to the first unit;
first magnets at the first unit, having substantially the same size as each other, the first magnets comprising south poles and north poles configured to face in a direction from the first unit toward the second unit or in an opposite direction to the direction, wherein the south pole and the north pole of one of any adjacent two of the first magnets face in opposite directions to facing directions of the south pole and the north pole of the other; and second magnets at the second unit, configured to face the first magnets, the second magnets comprising a south pole which faces one of the north poles of the first magnets and a north pole which faces one of the south poles of the first magnets, wherein the second unit comprises a receiver having one portion extending in a first direction from the first unit toward the second unit and another portion extending in a second direction where the first magnets are arranged, and the first unit comprises an engagement portion configured to be inserted into the receiver in the first direction, and configured to face an inner surface of the one portion in the second direction and to face an inner surface of another portion in the first direction so as to prevent the second unit from being detached from the first unit, wherein the engagement portion comprises a guide and a hook, the guide configured to be inserted into the receiver in the first direction, the hook configured to project from the guide to engage with the another portion of the receiver by being moved from the guide in the second direction, with an attraction force generated between the first magnets and the second magnets.

2. The electronic apparatus of claim 1, wherein each of the number of the first magnets and the number of the second magnets is three or more.

3. The electronic apparatus of claim 1, wherein a gap between the engagement portion and the receiver is smaller than a distance between centers of adjacent two of the first magnets.

4. An electronic apparatus comprising:

a first unit;

a second unit configured to be detachably attached to the first unit;

first magnets at the first unit, having substantially the same size as each other, the first magnets comprising south poles and north poles configured to face in a direction from the first unit toward the second unit or in an opposite direction to the direction, wherein the south pole and the north pole of one of any adjacent two of the first magnets face in opposite directions to facing directions of the south pole and the north pole of the other; and second magnets at the second unit, configured to face the first magnets, the second magnets comprising a south pole which faces one of the north poles of the first magnets and a north pole which faces one of the south poles of the first magnets, wherein the second unit comprises a first surface comprising a display screen, and a second surface opposite the first surface, and the first unit comprises a housing and a supporter, the housing comprising an accommodation portion and an upper wall, the supporter movable between a first position where the supporter is folded in the accommodation portion, and a second position where the supporter is pulled out from the housing, the supporter configured to support the second surface of the second unit, with an attraction force generated between the first magnets and the second magnets, and comprising a first member configured to be moved in substantially parallel with the upper wall, and a second member rotatably attached to the first member, the second member configured to be raised from the first member and support the second surface of the second unit in the second position, and a spring between the first member and the second member, the supporter is configured to be accommodated in the accommodation portion, with the spring elastically deformed, and when the supporter is pulled out from the housing, the second member is rotated by the spring.

\* \* \* \* \*